E. KING.
VALVE.
APPLICATION FILED MAR. 30, 1915.

1,157,163.

Patented Oct. 19, 1915.

Witnesses

Inventor
Edward King,
Attorneys

UNITED STATES PATENT OFFICE.

EDWARD KING, OF WASHINGTON, DISTRICT OF COLUMBIA.

VALVE.

1,157,163.  Specification of Letters Patent.  Patented Oct. 19, 1915.

Application filed March 30, 1915. Serial No. 18,173.

*To all whom it may concern:*

Be it known that I, EDWARD KING, a citizen of the United States of America, residing at Washington, District of Columbia, have invented certain new and useful Improvements in Valves, of which the following is a specification.

This invention relates to certain novel and useful improvements in valves and has particular application to a hand operated fluid controlling valve.

In carrying out the present invention it is my purpose to provide a hand operated fluid controlling valve wherein a fluid-tight connection will be formed between the valve stem and the bonnet without the use of packing or analogous material and wherein any wear between the stem and the bonnet at the point where the stem passes through the bonnet will be automatically taken up thereby preserving the efficiency of the joint during the life of the valve.

It is also my purpose to improve and simplify the general construction of hand operated valves and to provide a valve wherein the component parts will be so arranged and correlated as to reduce the possibility of derangement to a minimum.

With the above objects in view and others of a similar nature, the invention consists in the construction, combination and arrangement of parts set forth in and falling within the scope of the appended claims.

Figure 1:
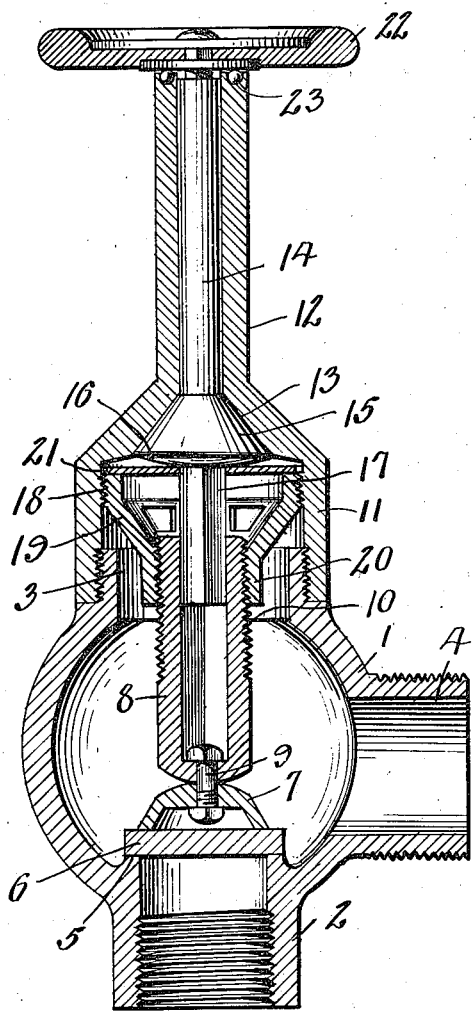
Figure 2:
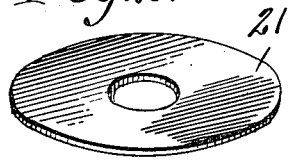

In the accompanying drawing: Figure 1 is a vertical central sectional view through a valve constructed in accordance with the present invention. Fig. 2 is a perspective view of a detail of the invention.

Referring now to the drawing in detail, 1 designates a spherical shaped valve casing having the lower end thereof formed with a depending interiorly threaded inlet nipple 2 and the upper end formed with an exteriorly screw threaded connecting nipple 3 alining axially with the nipple 2. Extending laterally from the body 1 is an exteriorly threaded outlet nipple 4. Formed on the inner surface of the body 1 concentrically of the nipple 2 at the juncture of the latter with the body is a valve seat 5 and engaging the seat 5 is a valve disk 6, and connected to the upper surface of the valve disk 6 is a yoke 7 having the central member thereof formed with an opening. Resting upon the central member of the yoke 7 and projecting upwardly therefrom is a tubular section 8 having the lower end thereof closed and formed with an opening alining with the opening in the central member of the yoke 7 and passed through these alining openings is a pivot bolt 9 forming a swivel connection between the lower end of the tubular section 8 and the yoke on the valve disk. This tubular extension 8 is disposed approximately centrally of the casing 1 and the upper end thereof is disposed within the nipple 3 and is exteriorly screw threaded as at 10, while the bore of the tubular section is of angular formation in cross section. Threaded onto the nipple 3 is a bonnet 11 and formed on the upper end of the bonnet 11 and extending upwardly therefrom is a sleeve-like extension 12. At the junction of the sleeve-like extension 12 with the bonnet 11 is formed a seat 13 opening onto the interior of the bonnet and decreasing in diameter from the bonnet end toward the extension end, as clearly illustrated in Fig. 1 of the drawing. Rotatably mounted within the sleeve-like extension 12 is a stem 14 and fixed upon the lower end of the stem 14 is a plug 15 having the side wall thereof tapered from the lower end toward the upper end to conform to the configuration of the seat 13 and nicely fitting such seat. The lower end of the plug 15 is preferably rounded off as at 16 and formed integrally therewith and depending therefrom is an axial shank 17 disposed within the tubular section 8 and of a cross sectional contour corresponding to that of the bore of the section 8. The lower rounded end of the plug 15 is disposed contiguous to the interior of the bonnet 11 and the inner side wall of the bonnet 11 immediately below the upper end thereof is screw threaded as at 18.

19 designates a spider disposed within the bonnet 11 and having the upper end thereof of greater diameter than the lower end. The relatively large upper end of the spider 19 is exteriorly screw threaded to engage the threads 18, while the lower end of the spider 19 is formed with a depending collar 20 designed to receive the upper end of the tubular extension 8 and interiorly screw threaded to receive the threads on the upper end of such tubular extension.

Interposed between the lower rounded end 16 of the plug 15 and the upper edge of the spider 19 is a metal diaphragm 21 having the peripheral edge resting upon the upper end of the spider 19 and the central portion abutting the rounded end 16 of the plug 15.

Fixed to the upper end of the stem 14 in some suitable manner is a hand wheel 22, and interposed between the washer at the undersurface of the hand wheel 22 and the upper ends of the sleeve-like extension 12 are anti-frictional bearings 23 serving to reduce the friction between the hand wheel and the sleeve-like extension in the rotation of the hand wheel to open and close the valve.

In practice, when the valve disk 6 is in engagement with the seat 5 the valve is closed and communication between the inlet and outlet nipples cut off. When it is desired to open the valve, the hand wheel 22 is rotated with the effect to revolve the stem 14 within the tubular extension 12 and in the rotation of the stem 14 similar motion is imparted to the shank 17 thereby revolving the tubular section 8 within the casing 1. As the upper end of the tubular section 8 is threaded into the collar 20 and the collar held stationary by means of the spider 19, the tubular section 8 will be elevated in the rotation thereof under the action of the stem, thereby moving the disk 6 out of engagement with the seat 5 and so opening the valve. In the upward movement of the tubular section 8 the latter slides over the shank 17.

The diaphragm 21 is of such nature as to force the tapered side of the plug 15 into engagement with the seat 13 thereby forming a fluid-tight joint at the point where the stem passes through the bonnet and eliminating the use of packing. When the valve is open, the steam or other fluid under pressure passing through said valve acts upon the undersurface of the diaphragm 21 to force the latter upwardly thereby increasing the pressure between the side of the plug 15 and the seat 13. Thus, any wear between the plug and the seat is automatically compensated for so that the fluid-tight joint is preserved.

To close the valve, the direction of rotation of the hand wheel 22 is reversed, thereby revolving the stem 14 and shank 17 with the effect to rotate and lower the tubular section 8 so as to engage the disk 6 with the seat 5.

While I have herein shown and described one particular form of my invention, by way of illustration, I wish it to be understood that I do not limit or confine myself to the precise details of construction herein described and delineated, as modification and variation may be made within the scope of the claims without departing from the spirit of the invention.

What I claim is:—

1. In valve construction, a casing having inlet and outlet openings, a valve arranged within said casing, a bonnet on one end of said casing, a sleeve-like extension formed on the upper end of said bonnet, said extension and bonnet, at the juncture thereof, being formed to provide a tapering seat, a stem rotatably mounted in said sleeve-like extension, a plug on the lower end of said stem having the side thereof tapered to conform to the taper of said seat and engaging said seat, a spider within said bonnet, a diaphragm interposed between said spider and the lower end of said plug and having the peripheral edge thereof engaging said spider and the central portion abutting said plug to hold the plug in snug engagement with said seat whereby a fluid-tight joint is formed, a connection between the lower end of said plug and said valve whereby the valve may be moved to opened and closed positions in the rotation of said stem, and means for revolving said stem, the undersurface of said diaphragm being in open communication with the interior of said valve casing to receive the pressure of the fluid passing therethrough whereby the plug will be forced into engagement with the seat to compensate for wear between the parts.

2. A hand operated valve comprising a casing having inlet and outlet ports and a valve seat formed therein between said ports, a valve disk co-acting with said seat and movable into and out of engagement therewith, a nipple formed on said casing co-axial with said valve seat, a bonnet carried by said nipple, a yoke secured to said valve disk within said casing, a tubular section having the lower end thereof closed and engaging the central portion of said yoke, the lower closed end of said section and the adjacent portion of said yoke being formed with alining openings, a pivot bolt passed through said openings and forming a swivel connection between said section and yoke, said tubular section having the upper end portion thereof exteriorly screw threaded and having the bore therein angular in cross section, a spider carried by said bonnet, a collar on the lower end of said spider receiving the upper end of said tubular section and interiorly screw threaded, a stem extending through the upper end of said bonnet and capable of rotation, a shank on the lower end of said stem disposed within the upper end of said tubular extension and of a cross sectional shape corresponding to that of the bore of said tubular extension whereby the tubular section will be rotated in the rotation of said shank and stem, the threaded connection between said collar and tubular section serving to move the tubular section longitudinally in the rotation thereof whereby the valve disk may be engaged with and disengaged from said seat for rotating said stem.

In testimony whereof I have hereunto set my hand in presence of two subscribing witnesses.

EDWARD KING.

Witnesses:
 JOHN P. GARRETT,
 C. CHESTER CAYWOOD.